United States Patent [19]

Shimada et al.

[11] Patent Number: 4,896,173
[45] Date of Patent: Jan. 23, 1990

[54] DATA PRINTER

[75] Inventors: Akira Shimada; Tetsuro Akasaki, both of Hitachi, Japan

[73] Assignee: Hitachi, Ltd., Tokyo, Japan

[21] Appl. No.: 334,368

[22] Filed: Apr. 7, 1989

[30] Foreign Application Priority Data

Apr. 8, 1988 [JP] Japan .................................. 63-85105

[51] Int. Cl.⁴ ............................................ G01D 15/00
[52] U.S. Cl. .................................... 346/154; 346/160
[58] Field of Search ................... 346/154, 160, 107 R, 346/108, 76 L; 369/106, 518, 519; 358/300, 302

[56] References Cited

U.S. PATENT DOCUMENTS 4,283,785  8/1981  Miyauchi et al. .................... 369/106
4,768,043  8/1988  Saito et al. ........................... 346/160

FOREIGN PATENT DOCUMENTS 6250818  4/1983  Japan .................................... 346/160

OTHER PUBLICATIONS

"Essentials of Development and Application of Non-Impact Printer" Electronics Essentielsekies, No. 14, Aug. 15, 1985 pp. 127, 141, 155.

Primary Examiner—Arthur G. Evans
Attorney, Agent, or Firm—Antonelli, Terry & Wands

[57] ABSTRACT

A first control mark pattern, extending continuously in the scan direction of dots written onto a photo sensitive drum in a printer and cut in pieces in the direction perpendicular to the scan direction, and composed of lines is formed at a predetermined position on the photosensitive drum. Similarly, a second control mark pattern composed of a pattern including components in the direction perpendicular to the scan direction is formed on a second predetermined position on the photosensitive drum. The print density is controlled so as to be a desired one in accordance with the first control mark pattern formed. The widths of lines printed in accordance with the second control mark pattern formed are controlled so as to be the same in both the scan direction and the direction perpendicular to the scan direction.

10 Claims, 10 Drawing Sheets

F I G. 3
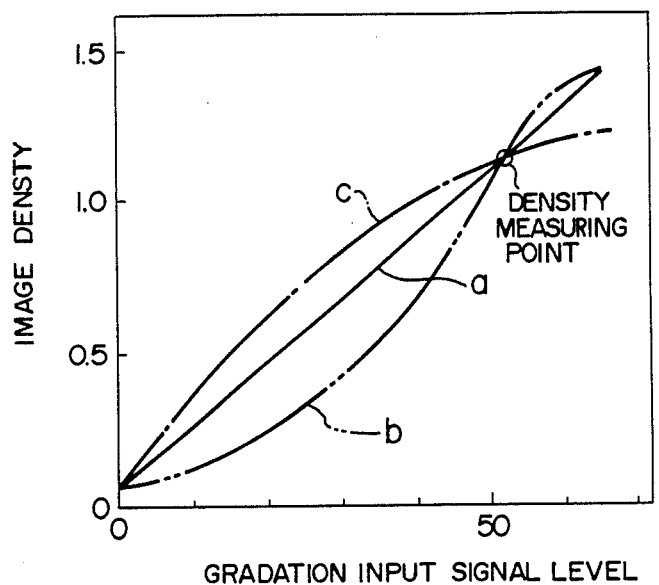
F I G. 4a
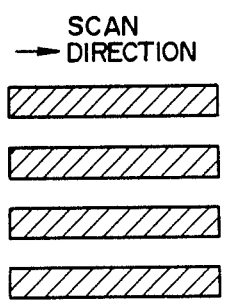
F I G. 4b
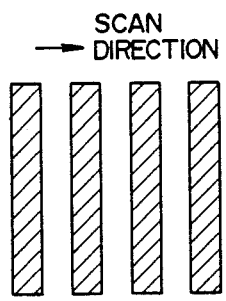
F I G. 4c
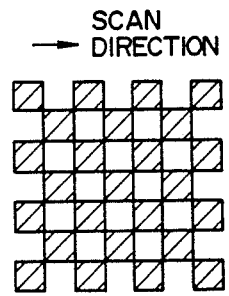

DATA PRINTER

BACKGROUND OF THE INVENTION

The present invention relates to data printers which output and print digital image data in a computer, a facsimile terminal, etc., and more particularly to the control of the quality of images printed by the printers.

Recently, printers using an electrophotographic process, electrostatic printers using an electrostatic recording process or thermal printers using a thermal recording process are generally used to output and record digital print data from computers, facsimile terminals, etc. The printers using the electrophotographic process include a laser printer using laser beam scanning and exposing techniques, an LED printer using an LED head including an array of LEDs one for each recorded dot as an exposure source, and a liquid crystal printer using a liquid crystal head having an array of liquid crystal shutters one for each recorded dot. The general principles, structures and operations of these printers are disclosed in a reference entitled "Essentials of Development and Application of Non-Impact Printers", *Electronics Essentials Series*, No. 14, first edition, Kabushiki Kaisha Nippon Kogyo Gijutu Center, Aug. 15, 1985, pages 127, 141 and 155. The problems with the conventional techniques will now be described by taking as an example one of the laser printers disclosed therein.

FIG. 1 is a schematic of a general laser printer using a semiconductor laser as an exposure source. The laser 1 modulates its rays in an on-off control manner via the driver 2 in accordance with an image signal. The modulated laser rays are collimated by a collimator lens 3, and the collimated rays are scanned deflectively over a photosensitive body 5 (hereinafter referred also to as a photoconductive recording medium) used as a recording medium by a polygon deflector 4. The photosensitive body 5 rotates in the direction perpendicular to the direction of scan of the laser beam 6. The laser beam 6 is focused by a focusing lens 7 onto the photosensitive drum 5 so as to have an appropriate beam spot diameter. An electrostatic latent image is formed on the photosensitive drum 5 by such scanning exposure. Thereafter, a visual image constituted usually by black and white bi-level dots through developing, transferring and fixing processes is printed and output on recording paper.

In this conventional printer, it is necessary to control the print density of the visual image on the recording paper invariably at an appropriate level. In addition, it is necessary to provide an optimal print image quality, for example, to beforehand equalize the widths of a horizontal and a vertical lines used for rules. To this end, various control systems are studied and put to practical use. As disclosed in JP-B-62-50818, there is a density control method of optically sensing the print density of a visual image on a photosensitive body or recording paper with a density sensor and controlling the print density in accordance with the output of the sensor.

Only by such control of the print density at the given appropriate level, however, the respective components of the laser printer using the electrophotographic process are likely to be changed due to aging and in characteristic depending on ambient conditions, so that the quality of the print image would be undesirably different from the initial set one. For example, even if the light emission modulation time for a laser in which the intensity of the exposing beam and the print width of one dot are determined is adjusted such that the horizontal and vertical line widths are equal initially, the widths of both the lines may be changed due to aging and changes in the ambient temperature because of the deterioration of the output characteristic of the semiconductor laser and a change in the exposure surface potential attenuation characteristic of the photosensitive body due to temperature. For example, the gradient of a curve indicative of the output characteristic of the semiconductor laser is reduced with a time interval in which the laser is used, as shown in FIG. 2a. Therefore, even if the intensity of the exposure beam and the light emission modulation time of the laser are fixed, the emission waveform of the laser becomes blunt as shown in FIG. 2b. In such a case, the width dv of a horizontal line does not change because printing is performed by the continuous emission of the laser, but the width of a vertical line associated intimately with the light emission waveform of the laser is thinned (dH−dH') with the deterioration of the laser light emission characteristic. With a change in the photosensitive body characteristic due to temperature, as mentioned above, a change in the width of the vertical line is small, but the horizontal line is thickened or thinned depending on the temperature level.

As just described above, the print density is controlled to a predetermined density level in the conventional printer, but there are no measures for protecting the initial appropriate image quality from the influence of changes in the environments where the printer is used, for example, changes in the ambient temperature, and aging due to long time use, and thus the image quality would change with time. These problems are likely to appear especially in the gradation characteristic used for recording a halftone image. For example, even if the gradation characteristic curve is initially set so as to be linear as shown by a characteristic curve a in FIG. 3, it may change to a characteristic curve b or c if there are changes in the quality of a print image, as mentioned above, and thus the output image would change undesirably each it is printed.

A similar problem would arise in a liquid crystal printer as well as an LED printer of a recording system in which an array of heads is used. In addition, a similar problem would also arise in a data printer such as an electrostatic printer and a thermal printer different in system from the liquid crystal and LED printers.

SUMMARY OF THE INVENTION

It is an object of the present invention to provide a data printer which eliminates the above problems with the conventional data printers, and is capable of printing an image with a constant appropriate quality even if the recording system is changed due to use in different environments and due to aging deriving from long time use.

In the present invention, control means which senses the print state of an image so as to maintain the optimal image quality at all times to control the printing conditions includes means for generating a first control mark pattern extending continuously in the scan direction in which data is written on a recording medium and cut in pieces in a direction perpendicular to the scan direction, and printing the mark pattern on the recording medium; means for generating a second control mark pattern either cut in pieces in the scan direction and continuously extending in a direction perpendicular to the scan direction or cut in pieces both in the scan direction and in the direction perpendicular to the scan direction and for printing the mark pattern on the recording medium; means for controlling the print density in accordance with the result of sensing the print density of the first control mark pattern; and means for controlling the print width of recorded dots in accordance with the result of sensing the print density of the second control mark pattern.

A signal indicative of the sensed density of the first print control mark contains many components corresponding to the print density, and a signal indicative of the print density of the second control mark contains many components corresponding to the line width.

Therefore, the print density controlling means responsive to the result of sensing the print density of the first control mark accurately controls the print density while the print width controlling means responsive to the result of sensing the print density of the second control mark accurately controls the width of a print line.

BRIEF DESCRIPTION OF THE DRAWINGS

FIG. 3 is a graph for explaining the gradation characteristics;

FIGS. 4a, 4b and 4c each illustrate the pattern of a control mark;

DESCRIPTION OF THE PREFERRED EMBODIMENTS

The present invention will now be described with reference to embodiments thereof.

EMBODIMENT 1

Figure 1:
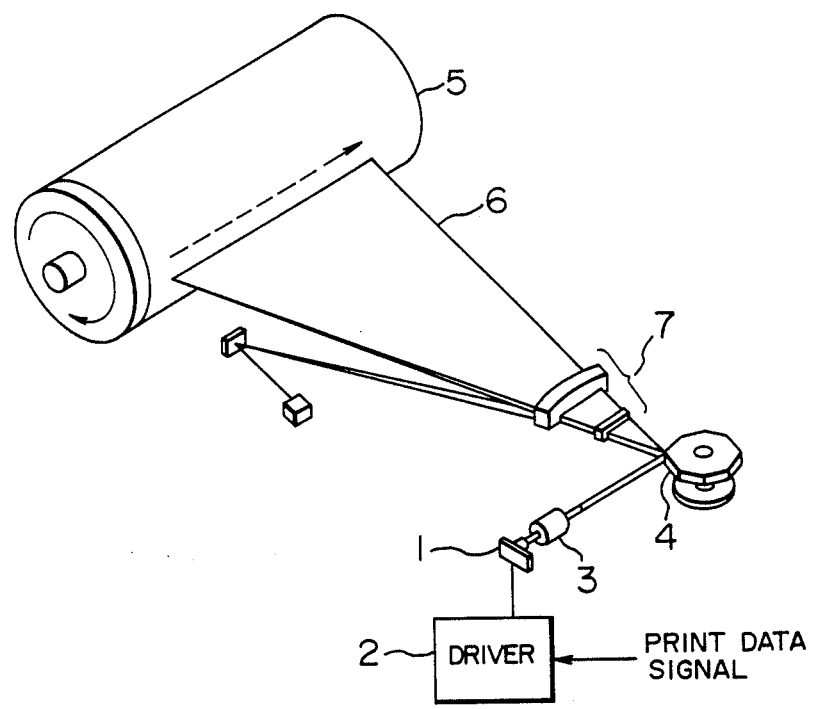
FIG. 1 is a schematic of a general laser printer.
Figure 2A:
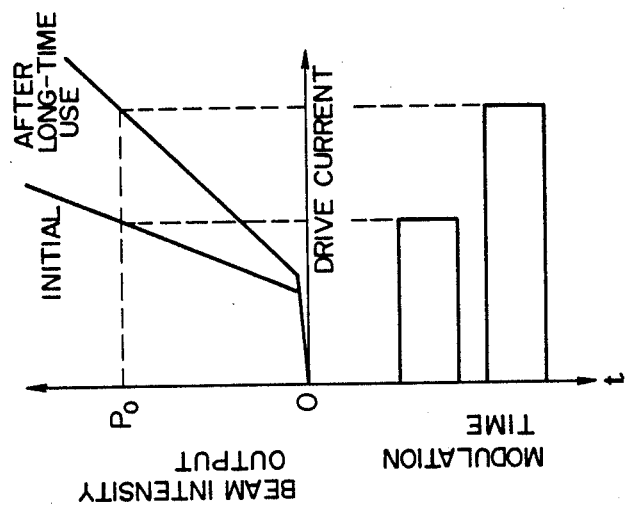
FIGS. 2a and 2b illustrate changes in the size of print dots due to changes in the output characteristic of a semiconductor laser.
Figure 2B:
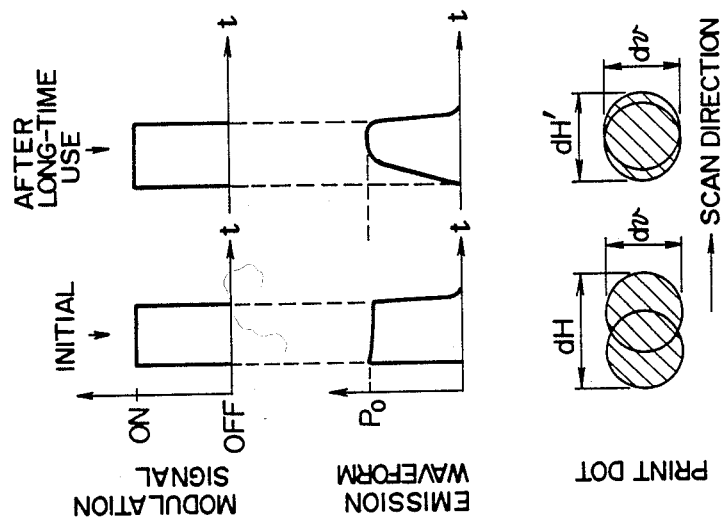
Figure 5:
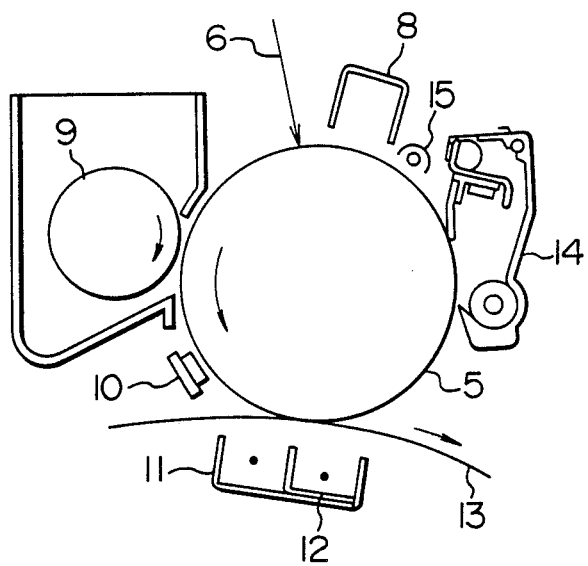
FIG. 5 is a schematic of a semiconductor laser printer as a first or second embodiment of the present invention.

FIG. 5 is a schematic of an illustrative laser printer to which the present invention is applied. In FIG. 5, reference numeral 5 denotes a photosensitive body; 8, a corona discharger which positively or negatively charges the whole surface of the photosensitive body 5 by corona discharge; 6, a scanning optical system using a semiconductor laser beam forming a desired electrostatic latent image on the photosensitive body 5; 9, a developing unit which develops as a visual image the latent image on the photosensitive body 5 using a toner; 11, a transfer unit which transfers the visual image onto recording paper 13; 12, a paper separator which separates the recording paper 13 from the photosensitive body 5 using an AC corona; 14, a cleaner which eliminates the remaining toner on the photosensitive body 5; and 15, a charge eliminator which eliminates the remaining charges on the photosensitive body 5.

Figure 6:
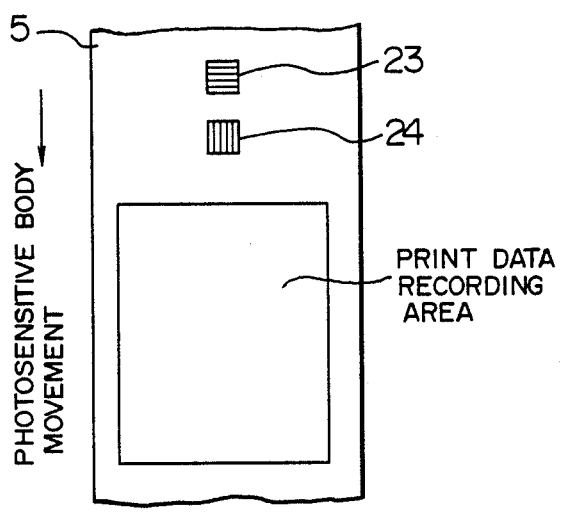
FIG. 6 illustrates the positions of print control marks.

A density sensor 10 is provided at a position close to the photosensitive body 5 surface between the developing unit 9 and the transfer unit 11 in order to sense the density of a control mark pattern to control the print condition. The density sensor 10 includes a light source and a photosensor, and optically reads the print density of the control mark formed on the photosensitive body 5 in accordance with a set pattern and outputs the result of sensing the print density. In the particular embodiment, the first control mark includes a pattern extending continuously in the scan direction and cut in pieces in the direction perpendicular to the scan direction, as shown in FIG. 4a, and the second control mark includes a pattern cut in pieces in the scan direction and extending continuously in the direction perpendicular to the scanning direction, as shown in FIG. 4b. In both the patterns, the print and non-print portions are equal in pixel area rate where the print and non-print portions are represented by black and white, respectively. Namely, each pattern has a black area rate of 50% and is a square or a vertically long rectangle (about 3–4 mm long × 3 mm wide). These control mark patterns are printed on the photosensitive body 5 along its central line (not shown) before recording paper 13 in the order of the first and second control mark patterns 23 and 24, as shown in FIG. 6.

Figure 7:
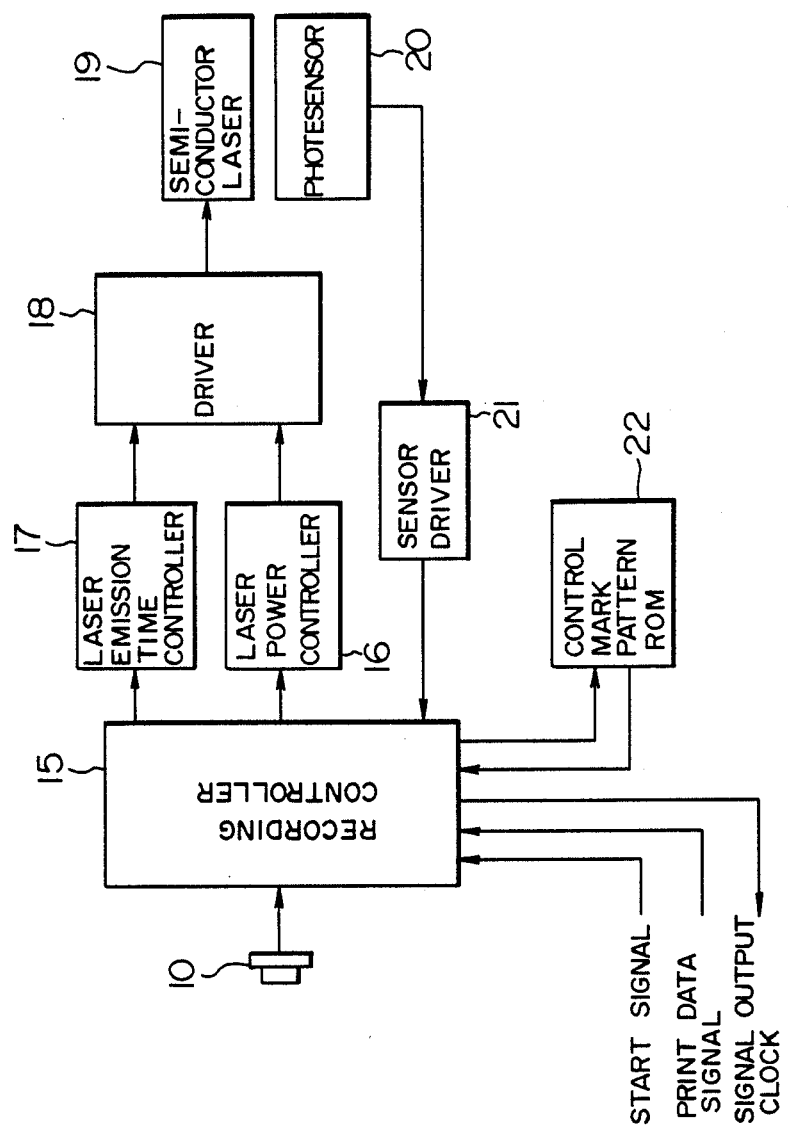
FIG. 7 is a block diagram of a record condition control section in the present invention.
Figure 8:
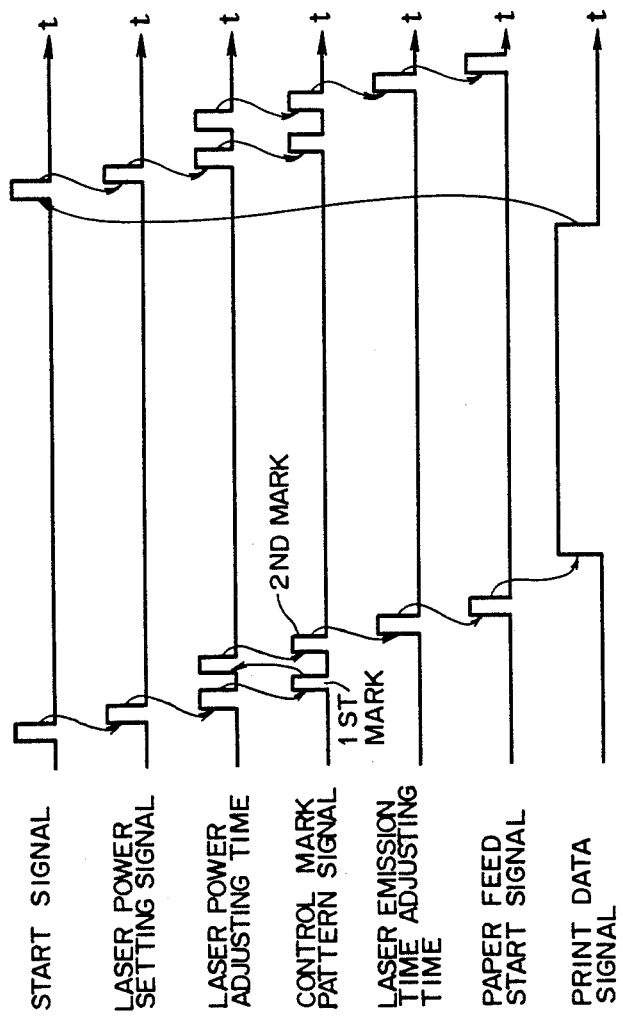
FIG. 8 illustrates the timing of various signal associated with the semiconductor laser printer.

A process in which the print density of these control mark patterns is sensed and the printing conditions of the printer are controlled in accordance with a signal indicative of the sensed density will be described. The structure of the recording condition control section is shown in FIG. 7 and the control timing is shown in FIG. 8.

Figure 9:
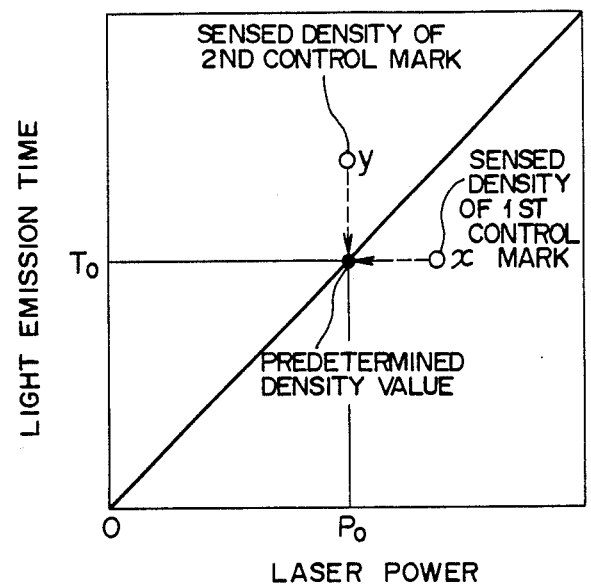
FIG. 9 illustrates a process of controlling print conditions.

On receipt of a start signal, a recording controller 15' adjusts the output power of a semiconductor laser 19 at a desired set point. This adjustment is performed by monitoring the output power from the semiconductor laser 19 using a photosensor 20 provided in the vicinity of the semiconductor laser 19, inputting the output from the photosensor via a sensor driver 21 to the controller 15', and actuating a laser power controller 16 by the recording controller 15' in accordance with that output. After the output power of the semiconductor laser 19 is set, the recording controller 15' delivers a signal to a control mark pattern generation ROM 22 in which the control mark patterns are stored to thereby cause the ROM to generate a first control mark pattern, which is then printed on the photosensitive body 5 as a recording medium. The print density of the pattern is sensed by the density sensor 10, the sensed density is then compared with a predetermined density value set beforehand as shown in FIG. 9. The recording controller 15' delivers to the laser power controller 16 a signal indicative of the difference such that the density print value coincides with the set point. The laser power controller 16 controls the current value in a driver 18 in accordance with that signal to control the output of the laser 19. With the laser printer, horizontal lines are recorded by continuously emitting a laser beam in the scan direction, so that the horizontal lines are printed by this control invariably with a constant line width even if the characteristic of a recording material such as the photosensitive body 5 may change.

After the adjustment of the laser power, the recording controller 15 delivers a signal to the control mark pattern generation ROM 22 to thereby cause same to generate a second control mark pattern, which is then printed on the photosensitive body 5. The print density of the pattern is sensed by the density sensor 10, and the sensed density is compared with a predetermined density value beforehand set, as shown in FIG. 9, as is the density of the first pattern. The recording controller 15' now delivers to the laser beam emission time controller 17 a signal indicative of the difference. In accordance with that signal, the laser emission time controller 17 adjusts the beam emission time of the semiconductor laser 19 such that the print density coincides with the set value. By this control, vertical lines can be printed invariably with a constant line width even if the light emission output characteristic of the laser may change due to temperature change and/or aging and hence the beam emission waveform may change.

After this series of steps has been terminated, the recording controller 15 outputs a paper feed signal to cause the printer to start to carry recording paper. The recording controller 15 receives a print data signal and prints on the recording paper synchronously with a printed area on the recording paper.

As the result of the above control, the vertical and horizontal lines were prevented from changing in line width and the halftone recording characteristic was prevented from changing in spite of aging and/or a change of the ambient conditions under which the printer was used to thereby ensure invariably printing with a constant appropriate image quality.

While such control may be provided before each printing, a constant appropriate image quality was obtained in spite of aging and a change of the ambient conditions under which the printer was used, only by providing such control either before first printing after the power source for the laser printer was turned on or before recording was re-started some time after the recording was stopped.

EMBODIMENT 2

The particular embodiment uses a laser printer of the same structure as the above embodiment 1 shown in FIG. 5, but differs from the embodiment 1 with reference to the density control mark patterns used to control the recording conditions. The first control mark pattern used to adjust the laser power is the same as that shown in FIG. 4a. However, a check pattern shown in FIG. 4c was used as the second control mark pattern to adjust the laser beam emission time. Either of these patterns is 50% in pixel area rate. The control procedures were the same as those in the first embodiment. As a result, as in the embodiment 1, vertical and horizontal lines did not change in width and the halftone recording characteristic did not change significantly due to aging and/or a change of the ambient conditions under which the printer was used, and a constant appropriate image quality was invariably maintained because the pattern of FIG. 4c contained components in the direction perpendicular to the scan direction.

Figure 10A:
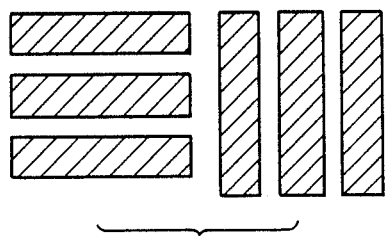
FIGS. 10a and 10b each illustrate an example of a control mark pattern.

The control mark pattern is not limited to that of 50% in pixel area rate in the above embodiment. A pattern of 70% in pixel area rate may be used as shown in FIG. 10a. Usually, a control mark pattern of about 10-90% and preferably 30-70% in pixel area rate are used because the recording conditions ar sensitively influenced by the print density in this region and the print density is easy to adjust.

Figure 10B:
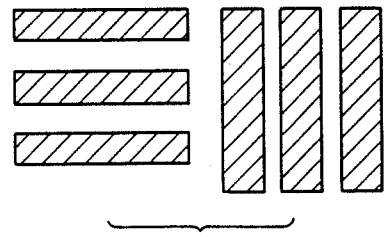

In the present invention, the first and second control mark patterns used are not required to be of the same in pixel area rate. As shown in FIG. 10b, a pattern of 50% in pixel area rate may be used as the first control mark pattern and a pattern of 70% in pixel area rate as the second control mark pattern.

EMBODIMENT 3

Figure 11:
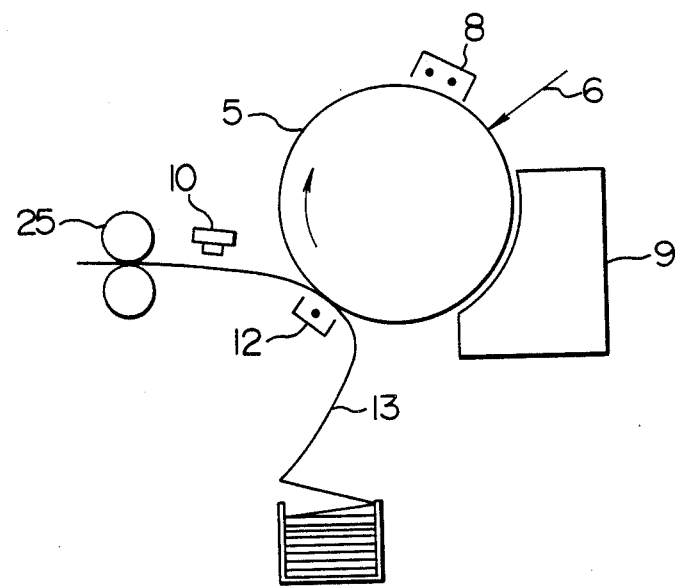
FIG. 11 is a schematic of a laser printer as a third embodiment of the present invention.
Figure 12:
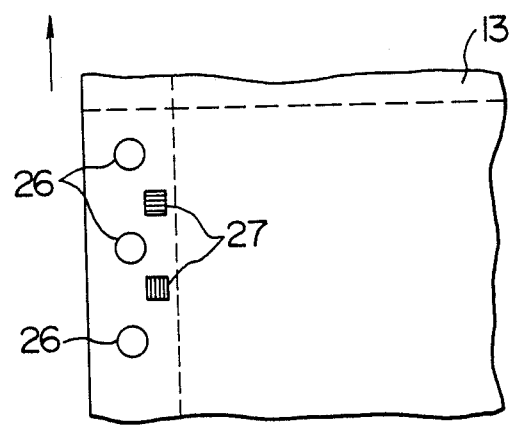
FIG. 12 illustrates the positions where control marks are printed.

The particular embodiment is a laser printer which measures control marks printed on recording paper as in the embodiments 1 and 2 and adjusts the recording conditions in accordance with the result of the measurement. The structure of the embodiment 3 is shown in FIG. 11 and is the same as that of the laser printer of the embodiment 1 in FIG. 5 except that the particular printer uses continuous recording paper 13 and that the density sensor 10 for the control mark patterns is disposed above a side of recording paper 13 outside its area in which print data is recorded, and not in the vicinity of the photosensitive body 5. The control mark patterns 27 are printed on a side of recording paper 13 outside its area in which the print data is recorded, as in FIG. 12. The control mark patterns and recording conditions in the particular embodiment are the same as those in the embodiments 1 and 2.

Figure 13:
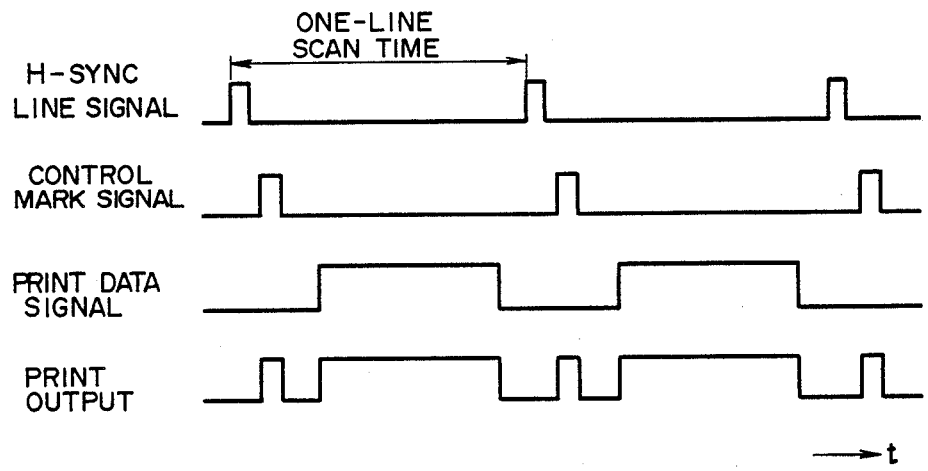
FIG. 13 illustrates the timing at which the control marks are printed.

The control method will now be described. In the particular embodiment, since the print densities of the marks formed on the recording paper 13 are sensed and controlled, the control mark pattern signal and print data signal are output as separate time intervals corresponding to the respective print portions in one line period in the scan direction as shown in FIG. 13. The densities of the marks printed on the side of recording paper 13 are sensed by the sensor 10 and the sensed results are stored for a predetermined time. The power and beam emission time of the laser are adjusted simultaneously at the juncture of sheets of recording paper (usually, this juncture portion has no images printed thereon, and no signals are generated which require printing of the image data on that portion).

As a result of the above control, the vertical and horizontal lines were prevented from changing in line width and the halftone recording characteristics were also prevented from changing in spite of aging and/or a change of the ambient conditions under which the printer was used. Thus printing was performed invariably with a constant appropriate image quality. Since in the particular embodiment the print densities of the marks printed on the recording paper 13 were sensed and controlled, they are influenced by the transfer (transfer characteristic), so that appropriate image quality was maintained with higher accuracy although there was the drawback that the control marks used for control should be printed at the end of the recording paper.

EMBODIMENT 4

Figure 14:
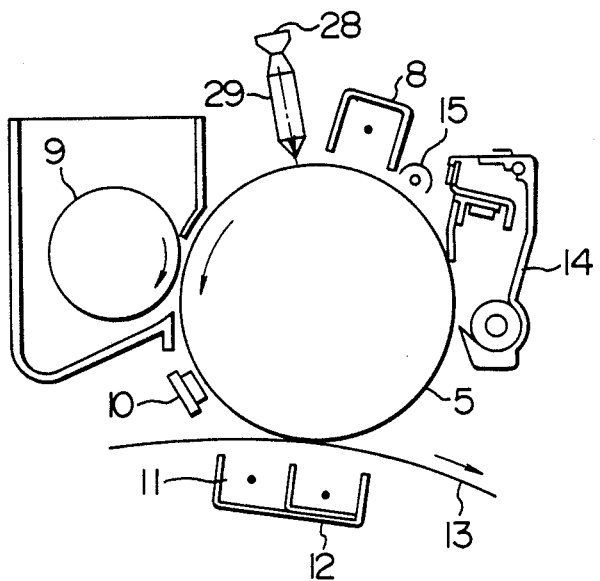
FIG. 14 is a schematic of an LED printer as a fourth embodiment of the present invention.

FIG. 14 is a schematic of an illustrative LED printer to which the present invention is applied. The basic electrophotographic process is the same as that in the embodiment 1. The scanning laser is not used as the exposure source for writing print data onto a recording medium, but an LED head 28 of an array of LEDs one for each record dot is used. The light from the head is focused onto the photosensitive body 5 as the recording medium via a self-focusing lens array 29. The LED head 28 is disposed such that the array of LEDs extends perpendicular to the direction in which the photosensitive body 5 is rotated. Thus the direction of scan of record dots is the same as the direction of rotation of the photosensitive body 5.

The procedures for sensing the print densities of the control mark patterns and controlling the printing conditions of the printer in accordance with signals indicative of the sensed densities are substantially the same as those in the embodiment 1, but the first and second control mark patterns differ from those used in the embodiment 1. In the LED printer, the first control mark uses a pattern extending continuously in the scan direction as shown in FIG. 4b and cut in pieces in the direction perpendicular to the direction of rows of the LEDs, namely, to the scan direction. The second control mark uses a pattern cut in pieces in the scan direction and in which dots are arranged successively in the direction perpendicular to the scan direction. The second control mark used may be a check pattern shown in FIG. 4c because the pattern of FIG. 4c includes components perpendicular to the scan direction.

In the control of the recording conditions, the density sensor 10 senses the print density of the first control mark pattern, and the output of the LEDs is adjusted in accordance with the sensed result as in the embodiment 1. In the LED printer, the vertical lines continuously emit light and are recorded in the scan direction, so that the vertical lines are printed invariably with a constant line width even if the characteristic of a recording material such as the photosensitive body 5 changes.

The print density of the second control mark pattern is sensed by the density sensor 10 and the emission time of the LEDs is adjusted in accordance with the sensed result. By this control, the horizontal lines are printed invariably with a constant line width even if the light emission waveforms change due to aging of and/or changes in the temperature of the LEDs.

As a result of the above control, the widths of the vertical and horizontal lines were prevented from changing in line width and the intermediate tone recording characteristic were also prevented from changing in spite of aging and changes in the ambient conditions under which the printer was used. Thus printing was performed invariably with a constant appropriate image quality.

The particular embodiment may be applicable to a liquid crystal printer using a head including an array of recording light sources as in the LED printer.

EMBODIMENT 5

Figure 15:
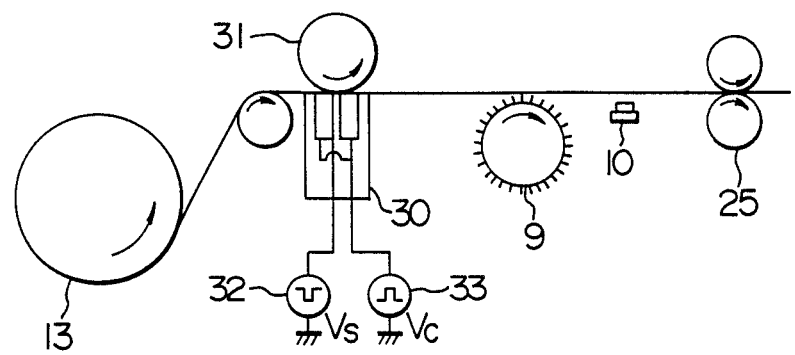
FIG. 15 is a schematic of an electrostatic printer as a fifth embodiment of the present invention.

FIG. 15 shows an electrostatic printer to which the present invention is applied. The principles of recording and operation of the printer will not be described here because they are described in the references mentioned before. Since the printer uses a roll of continuous paper as recording paper 13, control mark patterns are printed on a side of recording paper 13 outside its area in which print data is recorded as in the embodiment 3. The density sensor 10 which senses the print densities of the patterns is disposed at a position over which the control mark patterns pass.

Since the control mark patterns used had the same structure as those of the embodiment 4 because electrostatic recording heads 30 were arranged one for each recorded dot. The patterns of FIGS. 4b and 4a were used as the first and second control marks, respectively. The second control mark may be a check pattern shown in FIG. 4c.

The control of the recording conditions is the same as in the embodiment 3. The print density of the first control mark pattern is sensed by the density sensor 10, and the respective magnitudes of voltages of the recording signal 32 and control pulse 33 are adjusted in accordance with the sensed result. By this control, vertical lines were printed with a constant width even if the characteristic of a recording material such as recording paper 13 changed.

The print density of the second control mark pattern is sensed by the sensor 10, and respective pulse widths of the recording signal 32 and control pulse 33 voltage are adjusted in accordance with the sensed result. By this control, horizontal lines are printed invariably with a constant width even if the recording head 30 itself and the characteristics of the voltage drive circuit to which the recording signal 32 and control pulse 33 are applied may change due to temperature changes and aging.

As a result of the above control, the widths of the vertical and horizontal lines were prevented from changing in line width and the intermediate tone recording characteristics were also prevented from changing in spite of aging and changes in the ambient conditions under which the printer was used, and thus printing was performed invariably with a constant appropriate image quality.

EMBODIMENT 6

Figure 16:
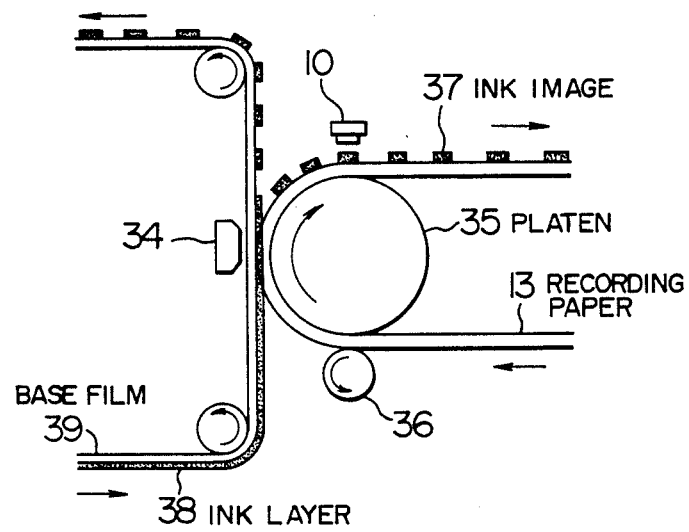
FIG. 16 is a schematic of a thermal printer as a sixth embodiment of the present invention.

FIG. 16 shows the structure of a thermal printer to which the present invention is applied. The particular printer is of a fusion and transfer type. The principles and operation of the printer are disclosed in the references mentioned before and will not be further described here. Since the printer uses a roll of continuous paper as the recording paper 13, the structure and control method of the control marks are substantially the same as those in the embodiment 5. The control marks are printed on a side of recording paper 13 outside the area in which print data is recorded, and the density sensor 10 which senses the print densities of the marks disposed at a position under which the control mark patterns pass.

In the control of the recording conditions, the pattern of FIG. 4b is used as the first control mark, and the magnitude of the voltage applied to the thermal head 34 is adjusted in accordance with the result of sensing the print density. By this control, vertical lines can be printed invariably with a constant line width even if the characteristic of a recording material such as recording paper 13 changes. The pattern of FIG. 4a is used as the second control mark pattern, and the pulse width of the voltage applied to the thermal head 34 is adjusted in accordance with the result of that use. By this control, horizontal lines can be printed invariably with a constant line width even if the drive circuit the voltage output from which is applied to the thermal head 34 changes in characteristic due to temperature changes and aging.

As a result of the above control, the vertical and horizontal lines were prevented from changing and the intermediate tone recording characteristic were also prevented from changing in line width in spite of aging and changes in the ambient conditions in which the printer was used. Thus printing was performed invariably with a constant appropriate image quality.

According to the present invention, a first control mark pattern extending continuously in the scan direction and cut in pieces in the direction perpendicular to the scan direction is generated, printed, and the print density is sensed and controlled in accordance with the sensed print density. A second control mark pattern either cut in pieces in the scan direction and extending continuously in the direction perpendicular to the scan direction or cut in pieces both in the scan direction and in the direction perpendicular to the scan direction is generated and printed, the print density is sensed, and the print width is controlled in accordance with the sensed print density. Therefore, the print density and width can be controlled accurately and the image quality is stabilized.

We claim:

1. A data printer comprising:
   data printing means for printing data on a recording medium in accordance with print data;
   control mark forming means for generating dot data on a control mark pattern to cause the data printing means to form on the recording medium a control mark the print state of which is sensed;
   print density sensing means for sensing the print density of the control mark formed on the recording medium; and
   print condition control means for controlling the print density brought about by the data printing means in accordance with the print density of the control mark sensed by the print density sensing means;
   wherein the control mark forming means includes first control mark pattern generating means for generating a first control mark pattern extending continuously in a scan direction in which print data is written and cut in pieces in the direction perpendicular to the scan direction and second control mark pattern generating means for generating a second control mark pattern either cut in pieces in the scan direction and extending continuously in the direction perpendicular to the scan direction or cut in pieces both in the scan direction and in the direction perpendicular to the scan direction and the print condition control means includes print density control means for controlling the print density of the first control mark pattern in accordance with the result of sensing the print density of the first control mark pattern; and print width control means for controlling the width of a print line in accordance with the result of sensing the print density of the second control mark pattern.

2. A data printer comprising:
   data printing means for controlling an exposure beam intermittently in accordance with print dot data to form an electrostatic latent image on a photoconductive recording medium ad developing the latent image with a toner to obtain toner image data;
   control mark forming means for generating dot means to form on the recording medium a control mark the print state of which is sensed;
   print density sensing means for sensing the print density of the control mark formed on the recording medium; and
   print condition control means for controlling the print density brought about by the data printing means in accordance with the print density of the control mark sensed by the print density sensing means;
   wherein the control mark forming means includes first control mark pattern generating means for generating dot data on a first control mark pattern extending continuously in the scan direction of the exposure beam and cut in pieces in the direction perpendicular to the scan direction and second control mark pattern generating means for generating dot data on a second control mark pattern either cut in pieces in the scan direction and extending continuously in the direction perpendicular to the scan direction or cut in pieces both in the scan direction and in the direction perpendicular to the scan direction and the print condition control means includes exposure beam intensity control means for controlling the intensity of the exposure beam in accordance with the result of sensing the print density of the first control mark pattern and dot data width control means for controlling the width of dot data in accordance with the result of sensing the print density of the second control mark pattern.

3. A data printer comprising:
   data printing means for deflectively controlling an exposure beam controlled intermittently in accordance with print dot data to scan and expose a photoconductive recording medium, moving the photoconductive recording medium in the direction perpendicular to the direction of scan of the exposure beam to form an electrostatic latent image on the photoconductive recording medium and developing the latent image with a toner to obtain toner image data;
   control mark forming means for generating dot data on a control mark pattern to cause the data printing means to form on the recording medium a control mark the print state of which is sensed;
   print density sensing means for sensing the print density of the control mark formed on the recording medium; and
   print condition control means for controlling the print density brought about by the data printing means in accordance with the print density of the control mark sensed by the print density sensing means;
   wherein the control mark forming means includes fist control mark pattern generating means for generating dot data on a first control mark pattern cut in pieces in the direction of movement of the photoconductive recording medium and extending continuously in the scan direction and second control mark pattern generating means for generating dot data on a second control mark pattern either cut in pieces in the scan direction and extending continuously in the direction of movement of the photoconductive recording medium or cut in pieces both in the scan direction and in the direction perpendicular to the scan direction and the printing condition control means includes exposure beam intensity control means for controlling the intensity of the exposure beam in accordance with the result of sensing the print density of the first control mark pattern and dot time width control means for controlling the width of dot time in accordance with the result of sensing the print density of the second control mark pattern.

4. A data printer comprising:
   data printing means for controlling intermittently an array of light emitting elements in accordance with print dot data to scan and expose same in the same direction of movement as the photoconductive recording medium, the array of light emitting elements one for each dot being arranged so as to be perpendicular to the direction of movement of the photoconductive recording medium, forming an electrostatic latent image on the photoconductive recording medium, and developing the latent image with a toner to obtain toner image data;

control mark forming means for generating dot data on a control mark pattern to cause the data printing means to form on the recording medium a control mark the print state of which is sensed;

print density sensing means for sensing the print density of the control mark formed on the recording medium; and print condition control means for controlling the print density brought about by the data printing means in accordance with the print density of the control mark sensed by the print density sensing means;

wherein the control mark forming means includes first control mark pattern generating means for generating dot data on a first control mark pattern extending continuously in the scan direction and cut in pieces in the direction perpendicular to the scan direction and second control mark pattern generating means generating dot data on a second control mark pattern either cut in pieces in the scan direction and in which dots are arranged successively in the direction perpendicular to the scan direction or cut in pieces both in those directions, and the printing condition control means includes exposure intensity control means for controlling the exposure intensity of the light emitting elements in accordance with the result of sensing the print density of the first control mark pattern and dot time width control means for controlling the width of dot time in accordance with the result of sensing the print density of the second control mark pattern.

5. A data printer according to claim 1, comprising means for selectively switching between dot data on the control mark pattern and data on print dots, whereby before the print dot data is printed on the recording medium, the dot data on the control mark pattern is output to print the control mark on the recording medium.

6. A data printer according to claim 1, comprising means for selectively switching between dot data on the control mark pattern and data on the print dots, whereby dot data on the control mark pattern and data on the print dots are printed in parallel on the recording medium.

7. A data printer according to claim 3, wherein data on the control mark pattern dots and data on the print dots are separately output in a time during which one line in the scan direction of the exposure beam is recorded.

8. A data printer according to claim 1, for causing a memory in which data on the control mark pattern is beforehand stored to generate that dot data.

9. A data printer according to claim 5, for outputting dot data on the control mark pattern, printing control marks on the recording medium, controlling printing conditions in accordance with the print densities of the control marks, and printing data on print dots on recording medium.

10. A data printer according to claim 6, for printing dot data on the control mark pattern and data on print dots in parallel on the recording medium, temporarily storing the result of sensing the control marks, and controlling the print conditions in accordance with the sensed print density during the time when the output of the print dot data disappears.

* * * * *